US012444331B2

(12) United States Patent
Zhu et al.

(10) Patent No.: US 12,444,331 B2
(45) Date of Patent: Oct. 14, 2025

(54) CONTROL SYSTEM, CONTROL METHOD USED FOR IT, AND DEVICE

(71) Applicant: BOE TECHNOLOGY GROUP CO., LTD., Beijing (CN)

(72) Inventors: Jianwen Zhu, Beijing (CN); Binhua Sun, Beijing (CN); Feng Zi, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/293,223

(22) PCT Filed: Jan. 30, 2023

(86) PCT No.: PCT/CN2023/073784

§ 371 (c)(1),
(2) Date: Jan. 29, 2024

(87) PCT Pub. No.: WO2024/159349

PCT Pub. Date: Aug. 8, 2024

(65) Prior Publication Data

US 2025/0078697 A1 Mar. 6, 2025

(51) Int. Cl.
*G09G 3/00* (2006.01)
*G02B 27/01* (2006.01)

(52) U.S. Cl.
CPC ......... *G09G 3/002* (2013.01); *G02B 27/0172* (2013.01); *G02B 2027/0174* (2013.01);
(Continued)

(58) Field of Classification Search
CPC ............. G09G 3/002; G09G 2330/021; G09G 2330/027; G09G 2330/045; G02B 27/0172; G02B 2027/0174
See application file for complete search history.

(56) References Cited

U.S. PATENT DOCUMENTS 12,094,404 B2 * 9/2024 Bao ........................ H05K 1/189
2006/0109394 A1 * 5/2006 Miyagawa ............. H05K 3/361
349/149

(Continued)

FOREIGN PATENT DOCUMENTS

CN 102725786 A 10/2012
CN 106920514 A 7/2017

(Continued)

OTHER PUBLICATIONS

Pan, Translation of CN106920514, Jul. 4, 2017 (Year: 2017).*

*Primary Examiner* — Dmitriy Bolotin

(74) *Attorney, Agent, or Firm* — Calfee, Halter & Griswold LLP

(57) ABSTRACT

The present disclosure provides a control system including: a module-group drive state monitor, a module-group drive controller and a module-group drive state regulator. The module-group drive state monitor is configured to obtain drive state parameters of a display module-group, wherein the drive state parameters reflect a drive state of the display module-group. The module-group drive controller is configured to: determine a current drive state of the display module-group based on the drive state parameters, and select a drive strategy for the display module-group based on the current drive state. The module-group drive state regulator is configured to: drive the display module-group based on the drive strategy that is selected. The present disclosure also relates to a control method that can be applied to the control system, and to a device that can perform the control method.

19 Claims, 9 Drawing Sheets

(52) U.S. Cl.
CPC . *G09G 2330/021* (2013.01); *G09G 2330/027* (2013.01); *G09G 2330/045* (2013.01)

(56) References Cited

U.S. PATENT DOCUMENTS

| | | | | |
|---|---|---|---|---|
| 2011/0130981 | A1 | 6/2011 | Chaji et al. | |
| 2012/0286679 | A1* | 11/2012 | Liu | H05B 45/46 315/193 |
| 2016/0027382 | A1 | 1/2016 | Chaji et al. | |
| 2018/0061294 | A1* | 3/2018 | Kim | G09G 3/367 |
| 2019/0259325 | A1 | 8/2019 | Chaji et al. | |
| 2020/0076182 | A1* | 3/2020 | Huang | G09G 3/36 |
| 2021/0082352 | A1 | 3/2021 | Lee et al. | |
| 2022/0284853 | A1* | 9/2022 | Bao | H10K 50/868 |
| 2022/0293021 | A1 | 9/2022 | Hong et al. | |
| 2023/0046660 | A1 | 2/2023 | Liu et al. | |
| 2024/0029674 | A1 | 1/2024 | Xi | |

FOREIGN PATENT DOCUMENTS

| | | | |
|---|---|---|---|
| CN | 108091311 | A | 5/2018 |
| CN | 109285508 | A | 1/2019 |
| CN | 111124096 | A | 5/2020 |
| CN | 109036311 | B | 6/2020 |
| CN | 110021274 | B | 3/2021 |
| CN | 112509505 | A | 3/2021 |
| CN | 113852147 | A | 12/2021 |
| CN | 111968594 | B | 4/2022 |
| CN | 113066438 | B | 7/2022 |
| CN | 114758617 | A | 7/2022 |
| CN | 114974115 | A | 8/2022 |
| CN | 113763900 | B | 9/2022 |
| CN | 115083321 | A | 9/2022 |
| CN | 115394228 | A | 11/2022 |
| CN | 113643663 | B | 12/2022 |
| CN | 115426739 | A | 12/2022 |
| CN | 218099788 | U | 12/2022 |
| JP | 2010-032789 | A | 2/2010 |
| WO | 2022/062697 | A1 | 3/2022 |
| WO | 2022/126330 | A1 | 6/2022 |

* cited by examiner

CONTROL SYSTEM, CONTROL METHOD USED FOR IT, AND DEVICE

RELATED APPLICATIONS

The present application is a 35 U.S.C. 371 national stage application of PCT International Application No. PCT/CN2023/073784, filed on Jan. 30, 2023, the entire disclosure of which is incorporated herein by reference.

TECHNICAL FIELD

The present disclosure relates to the field of display control technology, and specifically to a control system for controlling a display module and a control method that can be applied to the control system, and further to a device that can perform the control method.

BACKGROUND

Recently, the development of augmented reality (AR) devices, especially AR head-mounted devices, has been trending towards lightweight designs. However, this trend has, on the one hand, compressed the placement space of various modules within an AR head-mounted device, making the device dissipate heat poorly, and thus leading to a higher risk of abnormal operation of the device; on the other hand, in order to reduce the burden on the wearer of the AR head-mounted device, the size of its battery is often limited, so that the capacity of the battery has to be appropriately lowered, which negatively impacts the endurance of the whole machine.

SUMMARY

According to the first aspect of the present disclosure, there is provided a control system including: a module-group drive state monitor configured to obtain drive state parameters of a display module-group, wherein the drive state parameters reflect a drive state of the display module-group; a module-group drive controller configured to: determine a current drive state of the display module-group based on the drive state parameters, and select a drive strategy for the display module-group based on the current drive state; a module-group drive state regulator configured to: drive the display module-group based on the drive strategy that is selected.

According to some exemplary embodiments, the drive state parameters include: a measured value of an output voltage and a measured value of an output current of a power management integrated circuit supplying power to the display module-group, and a current power consumption value of the display module-group; the module-group drive state monitor includes a module-group electrical signal acquisition circuit, the module-group electrical signal acquisition circuit being configured to obtain the measured value of the output voltage, the measured value of the output current, and the current power consumption value; the module-group drive controller includes: an electrical state determination device configured to: determine the current drive state of the display module-group based on the measured value of the output voltage, the measured value of the output current and the current power consumption value; a drive strategy selector configured to: select a drive strategy for the display module-group based on the current drive state of the display module-group.

According to some exemplary embodiments, the module-group electrical signal acquisition circuit includes: a sampling resistor arranged in a power supply path from the output end of the power management integrated circuit to a power supply end of the display module-group; a voltage sensor configured to: measure a voltage at one end of the sampling resistor to obtain the measured value of the output voltage; a current sensor configured to: measure a voltage difference across the sampling resistor and obtain the measured value of the output current based on the voltage difference; a power consumption estimation device configured to: estimate a current power consumption value of the display module-group based on the measured value of the output voltage and the measured value of the output current.

According to some exemplary embodiments, the electrical state determination device is further configured to: in response to the measured value of the output voltage during a calibration adjustment stage being different from an output voltage preset value of the power management integrated circuit, determine a state of voltage to be calibrated; in response to the measured value of the output voltage during a feedback adjustment stage being greater than a preset voltage specification value, the measured value of the output current being greater than a preset current specification value, or the current power consumption value being greater than a preset power consumption specification value, determine an electrical abnormal state; the drive strategy selector is further configured to: in response to the state of voltage to be calibrated, select a voltage drive calibration strategy; in response to the electrical abnormal state, select a drive abnormality forcing adjustment strategy.

According to some exemplary embodiments, the module-group drive state regulator is further configured to, in response to a selection of the voltage drive calibration strategy, perform the following operations: based on a difference between the measured value of the output voltage and the output voltage preset value, determine a voltage calibration value; based on the voltage calibration value, adjust the output voltage of the power management integrated circuit.

According to some exemplary embodiments, the module-group drive state regulator is further configured to, in response to a selection of the drive abnormality forcing adjustment strategy, perform the following operations: in response to the measured value of the output voltage being less than or equal to a preset over-voltage threshold, the measured value of the output current being less than or equal to a preset over-current threshold, and the current power consumption value being less than or equal to a preset over-load threshold, reducing the output voltage of the power management integrated circuit; in response to the measured value of the output voltage being greater than the over-voltage threshold, the measured value of the output current being greater than the over-current threshold, or the current power consumption value being greater than the over-load threshold, make the power management integrated circuit stop supplying power to the display module-group.

According to some exemplary embodiments, the module-group electrical signal acquisition circuit further includes a fuse that is arranged in the power supply path and connected in series with the sampling resistor.

According to some exemplary embodiments, the module-group electrical signal acquisition circuit further includes: an electrical signal comparator configured to: in response to the measured value of the output voltage being greater than or equal to a preset over-voltage threshold and/or the measured value of the output current being greater than or equal to a preset over-current threshold, generate an over-voltage/over-current indication signal; a multi-channel AND gate circuit configured to: perform a logical AND operation between the over-voltage/over-current indication signal and a power management integrated circuit initial enable signal received from the module-group drive controller, so that an obtained power management integrated circuit enable signal is invalid.

According to some exemplary embodiments, the control system further includes an alarm configured to: perform an alarm operation in response to receiving an alarm enable signal from the module-group drive controller; wherein the module-group drive controller is further configured to: generate the alarm enable signal in response to receiving the over-voltage/over-current indication signal.

According to some exemplary embodiments, the module-group drive controller further includes a battery life evaluator, wherein: the battery life evaluator is configured to: estimate a battery life of the display module-group based on the current power consumption value and a current power value received from the module-group drive controller; in response to the battery life being less than a preset battery life threshold, determine an insufficient battery life state; the drive strategy selector is further configured to select a low power drive adjustment strategy in response to the insufficient battery life state.

According to some exemplary embodiments, the module-group drive state regulator is further configured to: in response to the low power drive adjustment strategy, make the power management integrated circuit reduce the output voltage.

According to some exemplary embodiments, the drive state parameters further include: an ambient temperature of a surrounding environment of the display module-group and a temperature inside the display module-group; the module-group drive state monitor further includes: an ambient temperature sensor configured to: measure the ambient temperature of the surrounding environment of the display module-group to generate an ambient temperature measured value; a module-group internal temperature sensor configured to: measure the temperature inside the display module-group to generate a module-group internal temperature measured value; the module-group drive controller further includes a temperature state determination device configured to: determine an ambient temperature abnormal state in response to the ambient temperature measured value being greater than an ambient temperature threshold which is preset; determine a module-group internal temperature abnormal state in response to the module-group internal temperature measured value being greater than an internal temperature threshold which is preset; the drive strategy selector is further configured to: select a heat dissipation adjustment strategy in response to the ambient temperature abnormal state; select the heat dissipation adjustment strategy or the low power drive adjustment strategy in response to the module-group internal temperature abnormal state.

According to some exemplary embodiments, the temperature state determination device is further configured to: in the feedback adjustment stage, when the ambient temperature measured value is not greater than the ambient temperature threshold and the module-group internal temperature measured value is not greater than the internal temperature threshold, in response to a continuous rise in the module-group internal temperature measured value corresponding to a same power consumption value of the display module-group in a preset time period, and the rate of rise being greater than a temperature rise rate threshold which is preset, determine a temperature rise abnormal state; the drive strategy selector is further configured to: select the heat dissipation adjustment strategy or the low power drive adjustment strategy in response to the temperature rise abnormal state.

According to some exemplary embodiments, the electrical state determination device is further configured to: in the feedback adjustment stage, in response to the module-group internal temperature measured value being less than the internal temperature threshold and a positive correlation existing between the module-group internal temperature measured value and the current power consumption value, determine a positive correlation state between temperature and power consumption; the drive strategy selector is further configured to: select the heat dissipation adjustment strategy or the low power drive adjustment strategy in response to the positive correlation state between temperature and power consumption.

According to some exemplary embodiments, the module-group drive state regulator is further configured to: in response to selecting the heat dissipation adjustment strategy, perform at least one of the following operations: increasing an operating voltage provided to a cooling fan; increasing a duty cycle of a drive signal provided to the cooling fan; and in response to selecting the low power drive adjustment strategy, make the power management integrated circuit to reduce the output voltage.

According to some exemplary embodiments, the module-group drive state regulator is further configured to: determine a corresponding gamma adjustment value based on the measured value of the output voltage and the module-group internal temperature measured value; reset a gamma value employed in the display module-group with the gamma adjustment value.

According to some exemplary embodiments, the drive state parameters further include a chromaticity and a brightness of a display screen of the display module-group; the module-group drive state monitor further includes: a module-group chroma sensor configured to: measure the chromaticity of the display screen of the display module-group to obtain a module-group chromaticity measured value; a module-group brightness sensor configured to: measure the brightness of the display screen of the display module-group to obtain a module-group brightness measured value; the module-group drive controller further includes a display state determination device configured to: in the calibration adjustment stage, in response to a difference between the module-group chromaticity measured value and a target chromaticity value being greater than a chromaticity difference threshold, or a difference between the module-group brightness measured value and a target brightness value being greater than a brightness difference threshold, determine a display module-group to be calibrated state; in the feedback adjustment stage, in response to the difference between the module-group chromaticity measured value and the target chromaticity value being greater than the chromaticity difference threshold, or the difference between the module-group brightness measured value and the target brightness value being greater than the brightness difference threshold, determine a display abnormal state; and in response to the display abnormal state, perform a temperature state determination and an electrical state determination, respectively; the drive strategy selector is further configured to: select a display module-group calibration strategy in response to the display module-group to be calibrated state.

According to some exemplary embodiments, the module-group drive regulator is further configured to: in response to adopting the display module-group calibration strategy, perform the following operations: determining a chromaticity calibration value based on the difference between the module-group chromaticity measured value and the target chromaticity value; determining a brightness calibration value based on the difference between the module-group brightness measured value and the target brightness value; adjusting a chromaticity offset value and a brightness offset value of the display module-group based on the chromaticity calibration value and the brightness calibration value.

According to the second aspect of the present disclosure, there is provided a control method including the following steps: obtaining drive state parameters of a display module-group, wherein the drive state parameters reflect a drive state of the display module-group; determining a current drive state of the display module-group based on the drive state parameters; selecting a drive strategy for the display module-group based on the current drive state; driving the display module-group based on the drive strategy which is selected.

According to some exemplary embodiments, the step of obtaining drive state parameters of a display module-group includes: obtaining display parameters, temperature parameters, and electrical parameters of the display module-group, wherein the display parameters include a module-group chromaticity measured value and a module-group brightness measured value, the temperature parameters include an ambient temperature measured value and a module-group internal temperature measured value, and the electrical parameters includes a measured value of an output voltage, a measured value of an output current and a current power consumption value; the step of determining a current drive state of the display module-group based on the drive state parameters includes: determining a display state based on the display parameters, determining a temperature state based on the temperature parameters, determining an electrical state based on the electrical parameters, and determining the current drive state of the display module-group based on determination results.

According to some exemplary embodiments, the control method further includes: performing a battery life estimation based on the current power consumption value and a current power value; selecting a drive strategy for the display module-group based on a result of the battery life estimation.

According to the third aspect of the present disclosure, there is provided a device including a display module-group, wherein the device includes a processor and a memory, the memory is configured to store executable instructions, the executable instructions are configured, when executed on the processor, to make the processor to perform the control method according to the second aspect of the present disclosure and the various exemplary embodiments thereof.

BRIEF DESCRIPTION OF DRAWINGS

Specific embodiments of the present disclosure will be described in detail in conjunction with the drawings so as to facilitate better knowledge and understanding of further details, features and advantages of the present disclosure. In the drawings.

Figure 1:
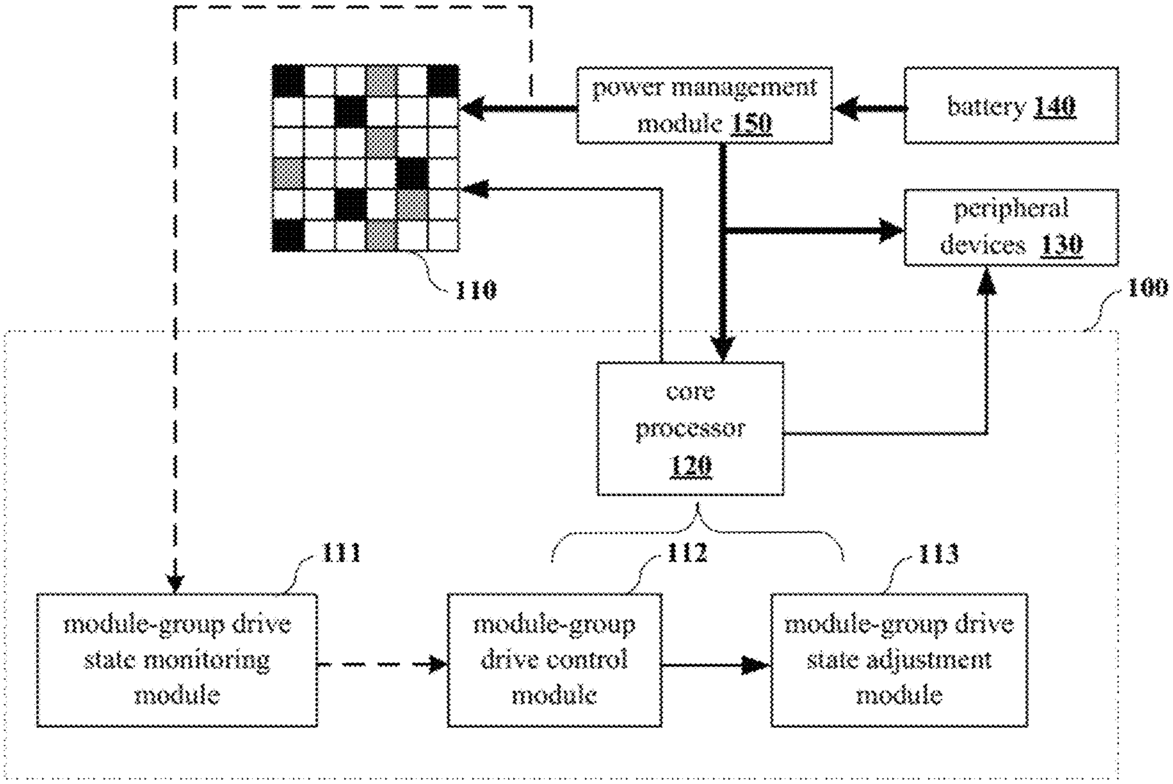
FIG. 1 schematically shows a control system according to the present disclosure in the form of a block diagram.

It shall be understood that the contents shown in the drawings are only for illustration and therefore are not necessary to be drawn in proportion. Furthermore, throughout the drawings, identical or similar features or features of the same type are indicated by identical or similar reference numerals.

DETAILED DESCRIPTION

The following description provides particular details of exemplary embodiments of the present disclosure so that those skilled in the art may fully understand and implement the technical solutions of the present disclosure.

Referring to FIG. 1, it schematically illustrates a control system according to the present disclosure in the form of a block diagram. As shown in FIG. 1, a power management module 150 is used to manage a battery 140 and supply power to a display module-group 110, a core processor 120, and peripheral devices 130, and the control system 100 is used to drive the display module-group 110 to perform a display, to monitor drive states of the display module-group 110, and to make adjustments in response to changes in the drive states of the display module-group 110. It should be understood that throughout the present disclosure, the term "display module-group" refers to a device that includes components such as a display screen, a display drive circuit, packaging components, and other components, which together form an individual device that can be independently installed and used. The power management module 150 may include a plurality of power management integrated circuits, abbreviated as PMIC, each of which is used to supply power to a corresponding component, such as powering the display module-group 110, the peripheral devices 130, and the like. In the present disclosure, the peripheral devices 130 may be additional devices used with the display module-group 110, for example, a control handle, an external audio device, an external memory, and the like. There are no specific restrictions on the type of the peripheral devices 130 in the present disclosure. In addition, in some implementations, the peripheral devices 130 may also be implemented as a cooling fan for lowering the ambient temperature of the environment in which the display module-group 110 is located, about which a detailed description is provided below.

The control system 100 includes a module-group drive state monitoring module 111, a module-group drive control module 112, and a module-group drive state adjustment module 113. The module-group drive state monitoring module 111 is configured to obtain drive state parameters of the display module-group, wherein the drive state parameters reflect the drive states of the display module-group. The drive state parameters may include at least one of a display parameter, a temperature parameter and an electrical parameter of the display module-group 110, or may also include any other suitable parameter as long as the parameter reflects the drive state of the display module-group 110. The module-group drive control module 112 is configured to: determine a current drive state of the display module-group 110 based on the drive state parameters, and select a drive strategy for the display module-group 110 based on the current drive state. The module-group drive state adjustment module 113 is configured to: drive the display module-group 110 based on the drive strategy that is selected. It should be understood that in other exemplary embodiments of the present disclosure, the module-group drive state adjustment module may also drive the display module-group based on manually inputted control parameters and/or control commands (for example, the required control parameters and/or control commands inputted via a suitable UI or interface). In this way, the module-group drive state adjustment module can achieve more flexible drive control of the display module.

Figure 2:
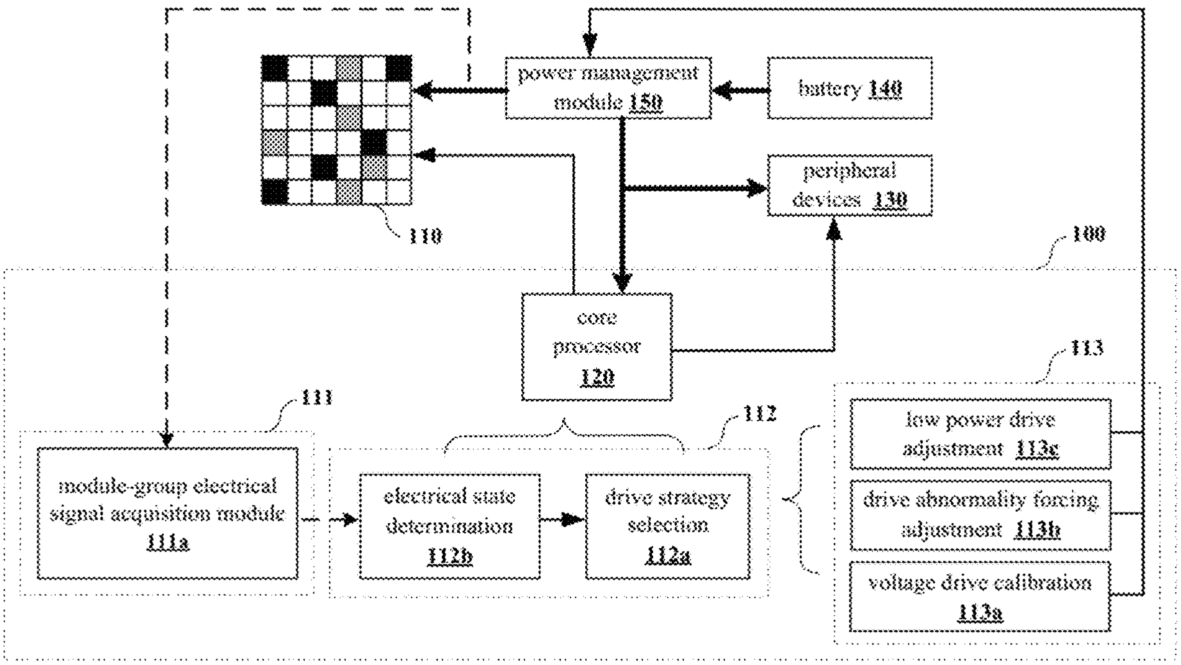
FIG. 2 schematically shows a control system according to an exemplary embodiment of the present disclosure in the form of a block diagram.

Referring to FIG. 2, it schematically illustrates a control system according to an exemplary embodiment of the present disclosure in the form of a block diagram. Compared with the control system shown in FIG. 1, FIG. 2 merely specifically illustrates the respective composition of the module-group drive state monitoring module 111, the module-group drive control module 112, and the module-group drive state adjustment module 113, according to an exemplary embodiment of the present disclosure. Accordingly, only the specific composition of these modules will be described below, and the same features will not be repeated.

As shown in FIG. 2, the module-group drive state monitoring module 111 includes a module-group electrical signal acquisition module 111*a*. The module-group electrical signal acquisition module 111*a* is configured to: measure the output voltage and the output current of the PMIC supplying power to the display module-group 110 and determine a current power consumption value of the display module-group 110. The module-group drive control module 112 includes an electrical state determination module 112*b* and a drive strategy selection module 112*a*. The module-group electrical signal acquisition module 111*a* transmits the measured values of the output voltage and the output current as well as the current power consumption value determined therefrom to the electrical state determination module 112*b*. The electrical state determination module 112*b* is configured to: determine a current drive state of the display module-group 110 based on the measured values of the output voltage and the output current of the PMIC supplying power to the display module-group 110 and the current power consumption value determined therefrom. The drive strategy selection module 112*a* is configured to: select a drive strategy for the display module-group 110 based on the current drive state of the display module-group 110. The module-group drive state adjustment module 113 is configured to: drive the display module-group 110 based on the drive strategy that is selected, for example, performing a voltage drive calibration 113*a*, a drive abnormality forcing adjustment 113*b*, or a low power drive adjustment 113*c*. As a result, the control system 100 is capable of monitoring the electrical state of the display module-group 110, such as monitoring its current voltage, current, and power consumption, and intelligently adjusting the drive of the display module-group 110 based on the monitoring results, thereby reducing the power consumption for driving the display module-group 110, and making the display module-group 110 avoid the electrical abnormal states such as over-current, over-voltage, or overload.

It is illustrated in FIG. 1 that the module-group drive control module 112 and the module-group drive state adjustment module 113 may be implemented in the core processor 120, for example, in the form of software or hardware modules. Accordingly, in some of the schematic drawings of the present disclosure, the core processor 120 is used to represent the module-group drive control module and the module-group drive state adjustment module in the control system for ease of illustration. However, it should be understood that it is not necessary for the module-group drive control module 112 and the module-group drive state adjustment module 113 to be implemented in the core processor 120, and that the module-group drive control module 112 and the module-group drive state adjustment module 113 as well as their respective included modules may be formed as separate modules independent of the core processor 120, depending on practical needs.

Figure 3:
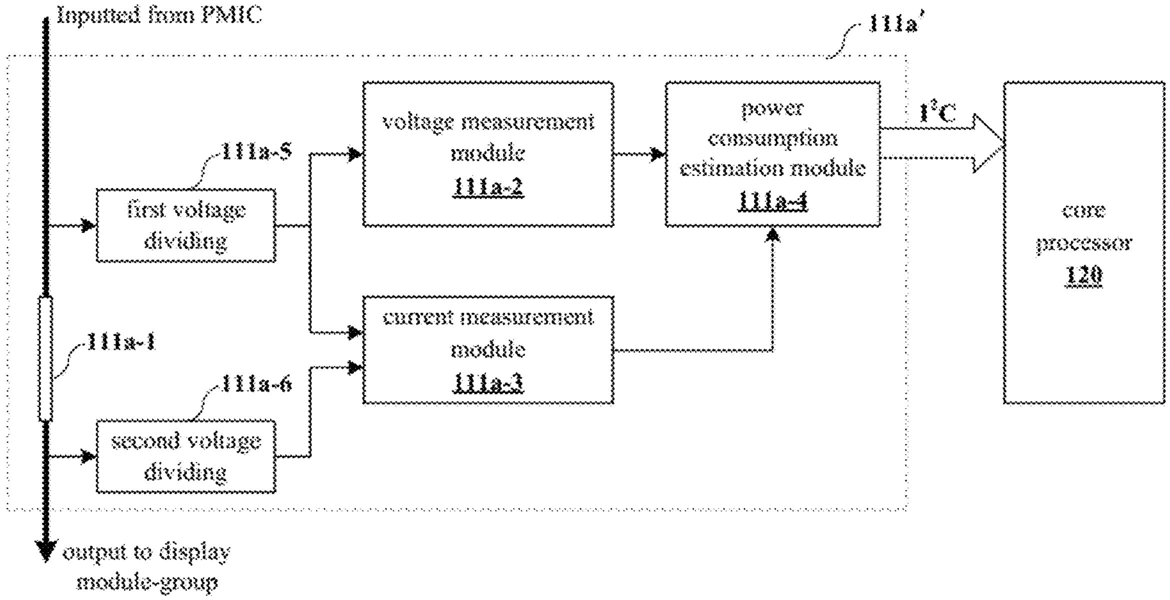
FIG. 3 schematically shows details of the control system shown in FIG. 2 in the form of a block diagram according to an exemplary embodiment of the present disclosure.

Referring to FIG. 3, it schematically illustrates, in the form of a block diagram, details of a module-group electrical signal acquisition module of the control system 100 shown in FIG. 2, according to an exemplary embodiment of the present disclosure. As shown in FIG. 3, and in conjunction with reference to FIG. 2, the module-group electrical signal acquisition module 111*a'* includes a sampling resistor 111*a*-1, a voltage measurement module 111*a*-2, a current measurement module 111*a*-3 and a power consumption estimation module 111*a*-4. The sampling resistor 111*a*-1 is arranged in a power supply path from an output terminal of the PMIC to a power supply terminal of the display module-group 110. The sampling resistor 111*a*-1 may be a precision resistor, and as a non-limiting example, it may be a precision resistor having a specification of 500 mΩ and 0.05%. The voltage measurement module 111*a*-2 is configured to: measure a voltage at one terminal of the sampling resistor 111*a*-1 to obtain a measured value of the output voltage of the PMIC. In FIG. 2, the voltage at the terminal of the sampling resistor 111*a*-1 connected to the output terminal of the PMIC is transmitted to the voltage measurement module 111*a*-2 through a first voltage dividing circuit 111*a*-5, and the voltage measurement module 111*a*-2 thereby generates the measured value of the output voltage of the PMIC. It should be understood that a measurement of the voltage at the other terminal of the sampling resistor 111*a*-1 may also be performed to generate the measured value of the output voltage. The current measurement module 111*a*-3 is configured to: measure a voltage difference across the sampling resistor 111*a*-1 and obtain a measured value of the output current of the PMIC based on the voltage difference. In FIG. 3, the voltage at the terminal of the sampling resistor 111*a*-1 connected to the output terminal of the PMIC is transmitted to the current measurement module 111*a*-3 through the first voltage dividing circuit 111*a*-5, and the voltage at the terminal of the sampling resistor 111*a*-1 connected to the power supply terminal of the display module-group 110 is also transmitted to the current measurement module 111*a*-3 through a second voltage dividing circuit 111*a*-6. The current measurement module 111*a*-3 amplifies this voltage difference to generate the measured value of the output current. As a non-limiting example, the current measurement module 111*a*-3 may be implemented as a high-precision conditioning amplifier. The measured values of the output voltage and the output current of the PMIC are transmitted to the power consumption estimation module 111*a*-4, whereby the power consumption estimation module 111*a*-4 is capable of estimating a current power consumption value of the display module-group 110. Referring to FIG. 3 and in conjunction with FIG. 2, the power consumption estimation modules 111*a*-4 may send the obtained electrical signals (for example, the measured values of the output voltage and the output current, and the current power consumption value) to the electrical state determination module 112*b* in the core processor 120, for example, via any suitable communication bus (such as a serial bus), thereby enabling the electrical state determination module 112*b* to determine the electrical state of the display module-group 110 based on these electrical signals. Furthermore, in some embodiments, the voltage measurement module 111*a*-2 and the power consumption estimation module 111*a*-4 can be integrated together, in which case the power consumption estimation module 111*a*-4 can directly measure the output voltage of this PMIC to obtain a measured value of the output voltage.

The control of the display module-group achieved by the module-group drive control module 112 and the module-group drive state adjustment module 113 mainly include two aspects: on the one hand, it includes a calibration adjustment, which occurs at the initial stage of the whole machine start-up of the device, and through the active monitoring and adjustment of the electrical module, calibrate the deviation between the actual working conditions of the control system and the preset modes to prevent the abnormality of the display state caused at the drive level in advance; on the other hand, it includes a feedback adjustment, which monitors the electrical signals of the display module-group during the operation of the device, and troubleshoots the drive at all levels to locate the causes and eliminate the faults according to the feedback of the anomalies.

Continuing to refer to FIG. 2, the electrical state determination module 112*b* is further configured to: in response to the measured value of the output voltage during a calibration adjustment stage being different from an output voltage preset value of the PMIC, determine a state of voltage to be calibrated; in response to the measured value of the output voltage during a feedback adjustment stage being greater than a preset voltage specification value, the measured value of the output current being greater than a preset current specification value, or the current power consumption value being greater than a preset power consumption specification value, determine an electrical abnormal state. Accordingly, the drive strategy selection module 112*a* is further configured to: in response to the state of voltage to be calibrated, select a voltage drive calibration strategy 113*a*; in response to the electrical abnormal state, select a drive abnormality forcing adjustment strategy 113*b*.

The module drive state adjustment module 113 is further configured to, in response to selecting the voltage drive calibration strategy 113*a*, perform the following operations: based on a difference between the measured value of the output voltage and the output voltage preset value, determine a voltage calibration value; based on the voltage calibration value, adjust the output voltage of the PMIC. As a result, the PMIC is able to output a voltage that accurately matches the module-group specifications in the current situation, reducing the influence of the situation of the main control board, the ambient temperature, and the load situation on the actual output value of the PMIC supplying power to the display module-group 110, and eliminating the deviation of the actual voltage value obtained by the display module-group 110.

The module-group drive state adjustment module 113 is further configured to, in response to a selection of the drive abnormality forcing adjustment strategy 113*b*, perform the following operations: in response to the measured value of the output voltage being less than or equal to a preset over-voltage threshold, the measured value of the output current being less than or equal to a preset over-current threshold, and the current power consumption value being less than or equal to a preset over-load threshold, reducing the output voltage of the PMIC; in response to the measured value of the output voltage being greater than the over-voltage threshold, the measured value of the output current being greater than the over-current threshold, or the current power consumption value being greater than the over-load threshold, make the PMIC stop supplying power to the display module-group 110. In the above two cases, the former is a case in which the value of the electrical signal exceeds the electrical specification value but is not obvious, and the display module-group can usually withstand the abnormality within a short period of time, and thus the adjustment can be made in this case after the abnormality is detected in order to eliminate the abnormality; whereas the latter is a case in which the value of the electrical signal exceeds the electrical specification value by too much, resulting in the display module-group no longer being able to withstand the abnormality, and thus it is necessary to cut off the power supply in order to protect the display module-group.

It should be appreciated that in other exemplary embodiments of the present disclosure, the module-group drive state adjustment module 113 may also drive the display module-group based on manually inputted electrical control parameters (for example, the required electrical control parameters, such as voltage parameters, current parameters, etc., inputted via a suitable UI or interface) and/or control commands, thereby realizing a more flexible drive control of the display module-group.

Figure 4:
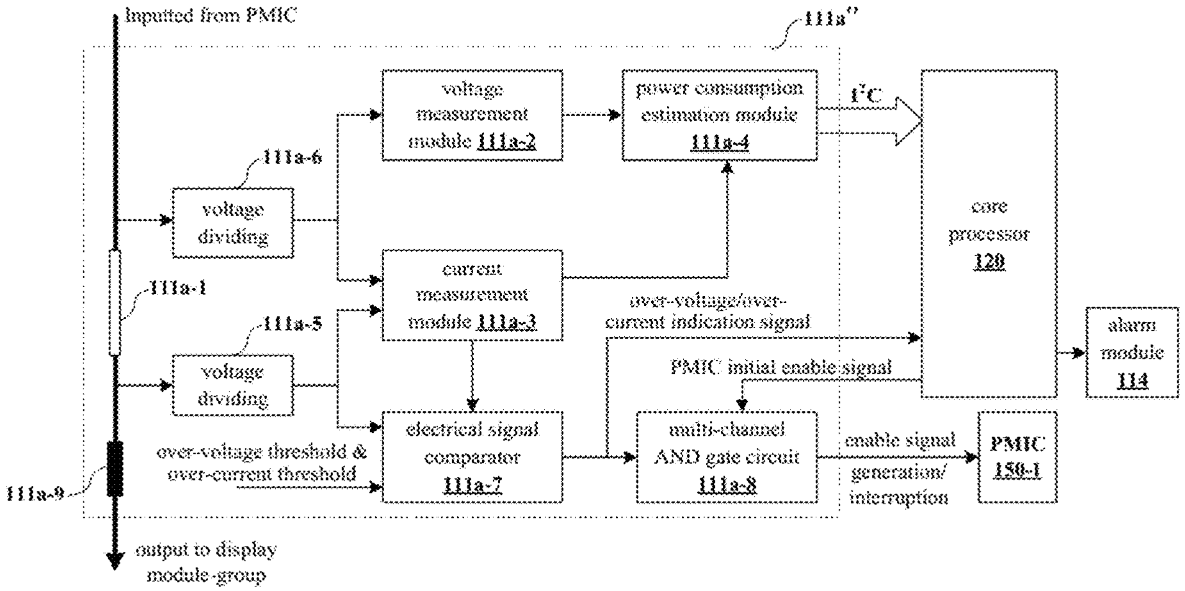
FIG. 4 schematically shows details of the control system shown in FIG. 2 in the form of a block diagram according to another exemplary embodiment of the present disclosure.

There are several ways to make the PMIC stop supplying power in response to over-voltage, over-current or overload. Referring to FIG. 4, it schematically illustrates, in the form of a block diagram, details of the module-group electrical signal acquisition module of the control system 100 shown in FIG. 2 according to another exemplary embodiment of the present disclosure. The module-group electrical signal acquisition module can make the PMIC stop supplying power by way of hardware circuits in the event of an electrical abnormal state. Compared to the module-group electrical signal acquisition module 111*a*' shown in FIG. 3, the module-group electrical signal acquisition module 111*a*" illustrated in FIG. 4 further includes an electrical signal comparator 111*a*-7, a multi-channel AND gate circuit 111*a*-

8, and a fuse 111*a*-9. Therefore, these features will be described hereinbelow, and the previously described features will not be repeated.

The electrical signal comparator 111*a*-7 is configured to: in response to the measured value of the output voltage of the PMIC being greater than or equal to a preset over-voltage threshold and/or the measured value of the output current of the PMIC being greater than or equal to a preset over-current threshold, generate an over-voltage/over-current indication signal. The multi-channel AND gate circuit 111*a*-8 is configured to: perform a logical AND operation between the over-voltage/over-current indication signal and a PMIC initial enable signal received from the core processor 120 (for example, the module-group drive control module 112 therein), so that an obtained PMIC enable signal is invalid, making the PMIC 150-1 stop supplying power to the display module-group. The logical relationship of the drive abnormality forcing adjustment realized based on the electrical signal comparators 111*a*-7 and the multi-channel AND gate circuit 111*a*-8 is shown in the following table.

TABLE 1

The logical relationship of the drive abnormality forcing adjustment

| Over-voltage/ Over-current | Initial EN of PMIC | PMIC EN | State of PMIC |
|---|---|---|---|
| No | 1 | 1 | Supplying power |
| No | 0 | 0 | — |
| Yes | 1 | 0 | Stopping supplying power |

The drive abnormality forcing adjustment based on the electrical signal comparator 111*a*-7 and the multi-channel AND gate circuit 111*a*-8 realized in the above logical relationship can make the PMIC stop supplying power by way of hardware circuits in the event of an electrical abnormal state. Therefore, the response is faster and the display module-group can be better protected.

The module-group electrical signal acquisition module 111*a*" further includes a fuse 111*a*-9 arranged in the power supply path from the output terminal of the PMIC to the power supply terminal of the display module-group 110 and connected in series with the sampling resistor 111*a*-1. The fuse 111*a*-9 is used to melt and disconnect in an emergency situation where the electrical status is seriously abnormal, so that the power supply from the PMIC to the display module-group is directly cut off. However, it should be appreciated that the fuse is not necessary, and in some exemplary embodiments, the module-group electrical signal acquisition module 111*a*" may not include the fuse 111*a*-9.

Continuing with reference to FIG. 4, an alarm module 114 is shown. When the electrical signal 111*a*-7 comparator generates an over-voltage/over-current indication signal, the electrical signal comparator 111*a*-7 transmits it to the core processor 120. After receiving the over-voltage/over-current indication signal, the core processor 120 sends an alarm enable signal to the alarm module 114, and the alarm module 114 performs an alarm operation in response to receiving the alarm enable signal.

Figure 5:
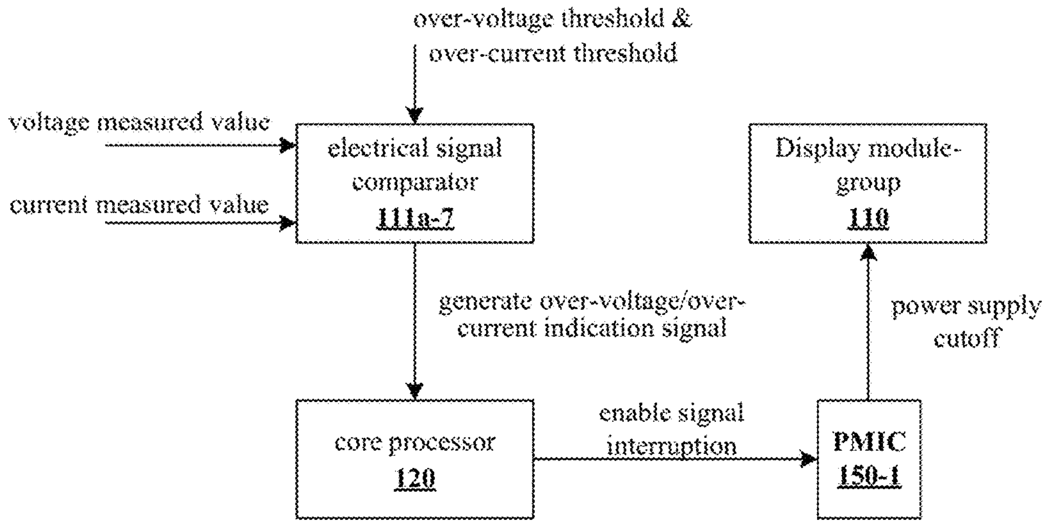
FIG. 5 schematically shows an implementation of drive abnormality forced adjustment according to an exemplary embodiment of the present disclosure.

Referring to FIG. 5, it schematically illustrates an implementation of drive abnormality forcing adjustment according to an exemplary embodiment of the present disclosure. As shown in FIG. 5, electrical signal comparator 111*a*-7 generates an over-voltage/over-current indication signal in response to the measured value of the output voltage of the PMIC being greater than or equal to a preset over-voltage threshold and/or the measured value of the output current of the PMIC being greater than or equal to a preset over-current threshold. The core processor 120, in response to receiving the over-voltage/over-current indication signal, interrupts the enable signal transmitted to the PMIC 150-1, thereby causing the power supply from the PMIC 150-1 to the display module-group 110 to be cut off. Accordingly, in the implementation shown in FIG. 5, the multi-channel AND gate circuit 111*a*-8 is omitted, and instead, the core processor 120 directly interrupts the enable signals, thereby reducing the complexity of the circuit.

As can be seen from the above description, the control system 100 shown in FIG. 2 is capable of monitoring the electrical state of the display module-group 110, such as monitoring at least one of its voltage, current and power consumption, analyzing and determining the drive state of the display module-group 110 based on the monitoring results, selecting a corresponding drive strategy based on the determined drive state, and thus performing an intelligent drive adjustment. As a result, the drive power consumption of the display module-group 110 can be reduced, and electrical anomalies such as over-current, over-voltage or over-load of the display module-group 110 can be prevented, which ensures that the device can operate stably and efficiently.

Figure 6:
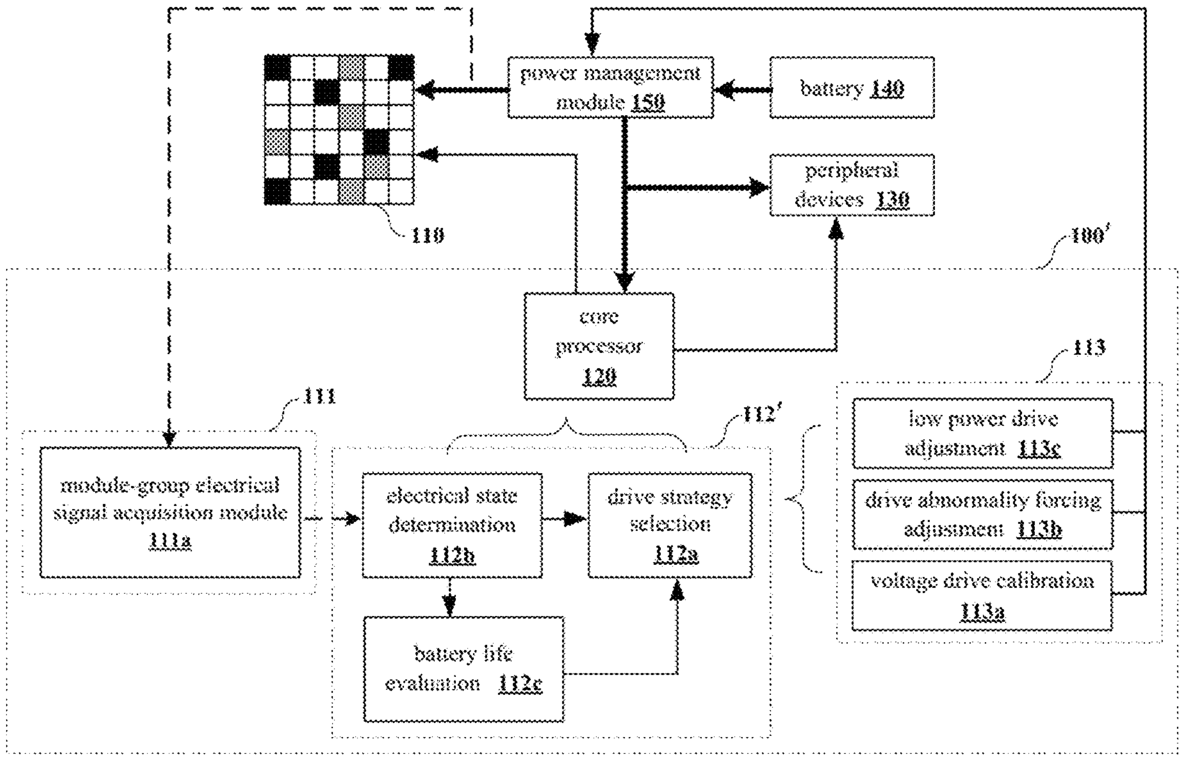
FIG. 6 schematically shows a control system according to another exemplary embodiment of the present disclosure in the form of a block diagram.

Referring to FIG. 6, it schematically illustrates a control system according to another exemplary embodiment of the present disclosure in the form of a block diagram. As shown in FIG. 6, the control system 100' differs from the control system 100 shown in FIG. 2 only in that the module-group drive control module 112' of the control system 100' also includes a battery life evaluation module 112*c*. Thus, the battery life evaluation module 112*c* will be described hereinafter only, and the other identical features will not be described repeatedly.

As shown in FIG. 6, the module-group drive control module 112' further includes a battery life evaluation module 112*c*. The battery life evaluation module 112*c* is configured to: estimate a battery life of the display module-group 112 based on the current power consumption value and a current power value received from the module-group drive control module 112'; in response to the battery life being less than a preset battery life threshold, determine an insufficient battery life state. The drive strategy selection module 113 is further configured to: select a low power drive adjustment strategy in response to the insufficient battery life state. The drive strategy selection module 112*a* is further configured to: select a low power drive adjustment strategy 113*c* in response to the insufficient battery life state. Accordingly, the module-group drive state adjustment module 113 is further configured to: in response to the low power drive adjustment strategy 113*c*, make the PMIC reduce the output voltage. The low power drive adjustment strategy 113*c* refers to a drive strategy that drives the display module-group to maintain its basic function at a significantly lower power consumption relative to the power consumption required for normal display of the display module-group. Accordingly, the low power drive adjustment strategy 113*c* may be referred to as an emergency avoidance mode, i.e., a self-protection measure when the display module-group is in an undesirable state. It should be understood that when adopting the low power drive adjustment strategy 113*c*, because the display module-group is not in a normal state, it will not consider meeting the user's optimal display needs, but will give priority to how to return the display module to normal display.

It should be understood that the basic power consumption of the display module-group 110 is directly determined by the positive and negative voltages applied thereto, as well as the power consumption of the logic circuits, and thus the control system may directly send commands to the corresponding PMICs to reduce their output voltages, so that the power consumption of the display module-group is reduced accordingly. However, there are two problems in reducing the power consumption of the display module-group in this way. First, the reduction of the positive and negative voltages applied to the display module-group will cause the display module-group to have a problem of gamma mismatch; and second, the reduction of the logic voltage level may cause the drive integrated circuits to fail to work properly. Thus, in the technical solution of the present disclosure, the former can be overcome by re-adjusting the gamma timely for matching, and the latter can be overcome by strictly clamping the output voltage of the PMIC above the minimum operating voltage of the drive integrated circuits of the display module-group.

Figure 7:
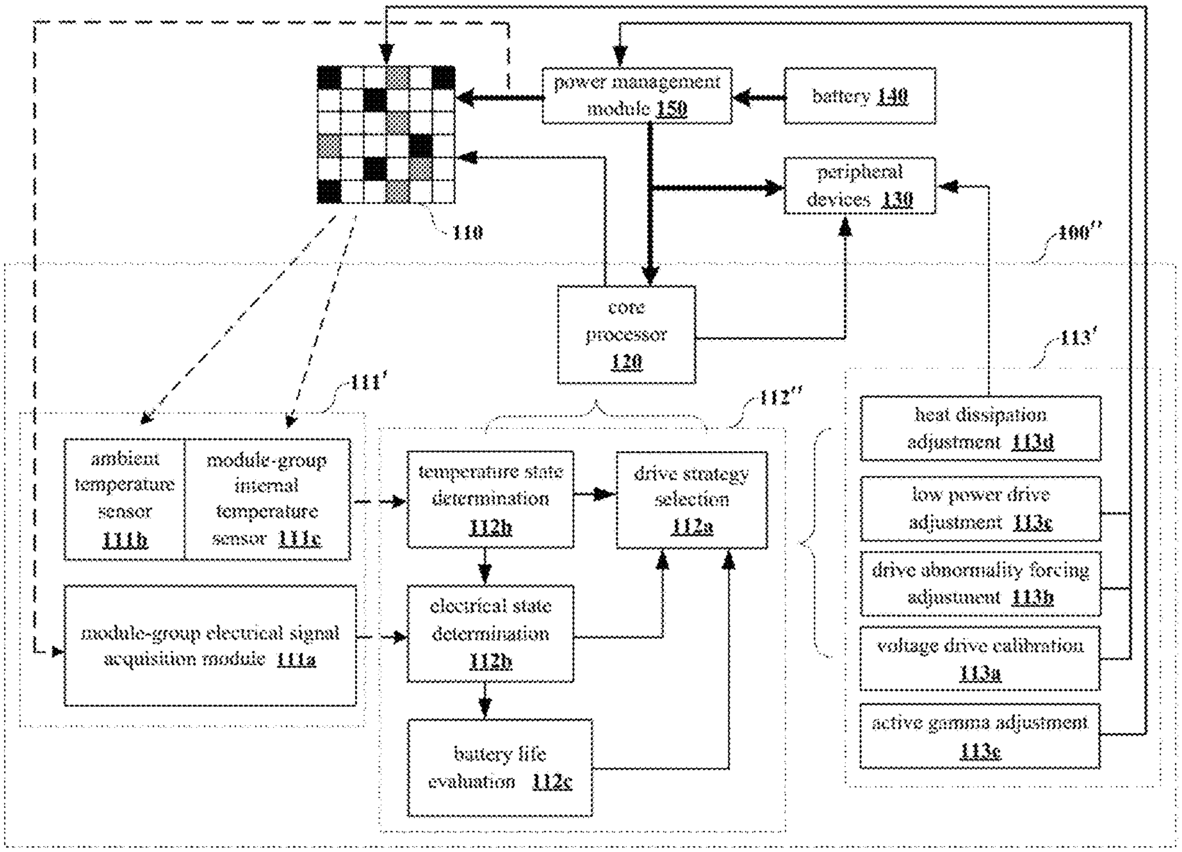
FIG. 7 schematically shows a control system according to yet another exemplary embodiment of the present disclosure in the form of a block diagram.

Referring to FIG. 7, it schematically illustrates a control system according to yet another exemplary embodiment of the present disclosure in the form of a block diagram. As shown in FIG. 7, the control system 100'' differs from the control system 100' shown in FIG. 6 only in that the module-group drive state monitoring module 111' further includes an ambient temperature sensor 111*b* and a module-group internal temperature sensor 111*c*, the module-group drive control module 112'' further includes a temperature state determination module 112*d*, and the module-group drive state adjustment module 113' further includes a heat dissipation adjustment strategy 113*d* and an active gamma adjustment strategy 113*e*. Therefore, only the above differences will be described hereinafter, and the other identical features will not be described repeatedly.

In the control system 100'' shown in FIG. 7, the ambient temperature sensor 111*b* is configured to: measure the ambient temperature of the surrounding environment of the display module-group 110 to generate an ambient temperature measured value; and the module-group internal temperature sensor 110*c* is configured to: measure the temperature inside the display module-group 110 to generate a module-group internal temperature measured value. Thus, the ambient temperature measured value reflects the temperature condition in the operating environment of the display module-group 110, and the module-group internal temperature measured value reflects the temperature condition of the display module-group 110 itself due to power consumption and heat dissipation during operation. The ambient temperature measured value and the module-group internal temperature measured value are transmitted to the temperature state determination module 112*d*, for example, possibly via an $I^2C$ bus. The temperature state determination module 112*d* is configured to: determine an ambient temperature abnormal state in response to the ambient temperature measured value being greater than an preset ambient temperature threshold; and determine a module-group internal temperature abnormal state in response to the module-group internal temperature measured value being greater than an preset internal temperature threshold. Accordingly, the drive strategy selection module 112*a* is further configured to: select a heat dissipation adjustment strategy 113*d* in response to the ambient temperature abnormal state; and select the heat dissipation adjustment strategy 113*d* or the low power drive adjustment strategy 113*c* in response to the module-group internal temperature abnormal state. Therefore, for the ambient temperature, no matter in the calibration adjustment stage or in the feedback adjustment stage, as long as the ambient temperature measured value is greater than the preset ambient temperature threshold, an ambient temperature abnormal state can be determined. For the module-group internal temperature, generally, the measured value thereof may exceed the internal temperature threshold only in the feedback adjustment stage, so the monitoring of the module-group internal temperature and the corresponding adjustment are generally performed in the feedback adjustment stage.

When neither the ambient temperature measured value nor the module-group internal temperature measured value exceeds a preset threshold, further temperature exceeding risk determination is still required. For example, the control system may periodically sample the display screen of the display module-group and may analyze the grey scale information therein, thereby analyzing a plurality of display screens of the same power consumption level over a period of time in the past. If, over a period of time, the module-group internal temperatures at the corresponding moments of the display screens of the same power consumption level shows a continuous rising trend, it can be considered that the display module-group is currently at risk of temperature overshoot and a decision can be made to take a heat dissipation intervention or a low power drive mode depending on the rate of rise. Specifically, the temperature state determination module 112*d* is further configured to: in the feedback adjustment stage, when the ambient temperature measured value is not greater than the ambient temperature threshold and the module-group internal temperature measured value is not greater than the internal temperature threshold, in response to a continuous rise in the module-group internal temperature measured value corresponding to a same power consumption value of the display module-group 110 in a preset time period, and the rate of rise being greater than a temperature rise rate threshold which is preset, determine a temperature rise abnormal state. Accordingly, the drive strategy selection module 112*a* is further configured to: select the heat dissipation adjustment strategy 113*d* or the low power drive adjustment strategy 113*c* in response to the temperature rise abnormal state.

In addition, the control system 100'' shown in FIG. 7 is also capable of determining and adjusting a positive correlation condition between temperature and power consumption that may occur in the display module-group 110. The positive correlation condition between temperature and power consumption refers to a situation in which the higher the temperature in the display module-group, the higher the power consumption, which in turn causes the temperature to further increase, and continues such a vicious cycle, ultimately causing damage to the display module-group. Accordingly, in the control system 100'', neither the ambient temperature measured value nor the module-group internal temperature measured value exceeds a preset threshold, the electrical state determination module 112*b* is further configured to: in the feedback adjustment stage, in response to the module-group internal temperature measured value being less than the internal temperature threshold and a positive correlation existing between the module-group internal temperature measured value and the current power consumption value, determine a positive correlation state between temperature and power consumption. Accordingly, the drive strategy selection module 112*a* is further configured to: select the heat dissipation adjustment strategy 113*d* or the low power drive adjustment strategy 113*c* in response to the positive correlation state between temperature and power consumption.

The module-group drive state adjustment module 113' is further configured to: in response to selecting the heat dissipation adjustment strategy, increase an operating voltage provided to a cooling fan, and/or increase a duty cycle of a drive signal provided to the cooling fan; and in response to selecting the low power drive adjustment strategy, make the power management integrated circuit to reduce the output voltage. It should be understood that in other exemplary embodiments of the present disclosure, the module-group drive state adjustment module 113' may also drive the display module-group based on manually inputted temperature control parameters (for example, the required temperature control parameters inputted via a suitable UI or interface) and/or control commands, thereby realizing more flexible drive control of the display module-group.

Figure 8:
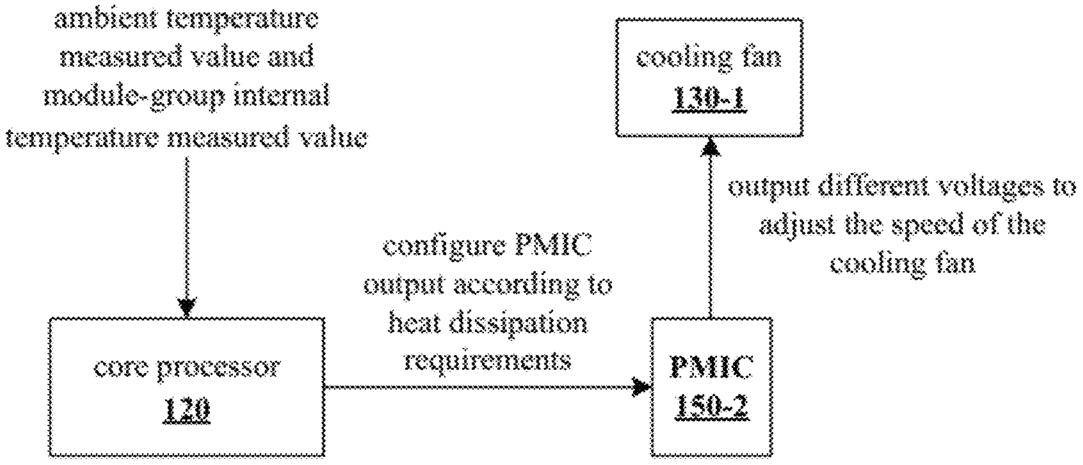
FIG. 8 schematically shows an implementation of heat dissipation adjustment according to an exemplary embodiment of the present disclosure.

Referring to FIG. 8, it schematically illustrates an implementation of heat dissipation adjustment in accordance with an exemplary embodiment of the present disclosure. As shown in FIG. 8, the peripheral devices 130 may be implemented as a cooling fan 130-1. Accordingly, the core processor 120 (which may have a module-group drive control module 112" and a module-group drive state adjustment module 113' thereon) receives the ambient temperature measured value and the module-group internal temperature measured value, and the core processor 120 may configure, based on the cooling requirements, the output of the PMIC 150-2 that supplies power to the cooling fan 130-1, including adjusting the output voltage of the PMIC or adjusting the duty cycle of the drive signal provided to the cooling fan 130-1, thereby enabling adjustment of the fan speed of the cooling fan 130-1.

The module-group drive state adjustment module 113' is further configured to: determine a corresponding gamma adjustment value based on the measured value of the output voltage and the module-group internal temperature measured value; and reset a gamma value employed in the display module-group with the gamma adjustment value. The active gamma adjustment is performed because the changes in the module-group internal temperature and/or the output voltage of the PMIC can lead to a gamma mismatch in the display module-group, and therefore the gamma adjustment is required to make it re-matched.

Figure 9:
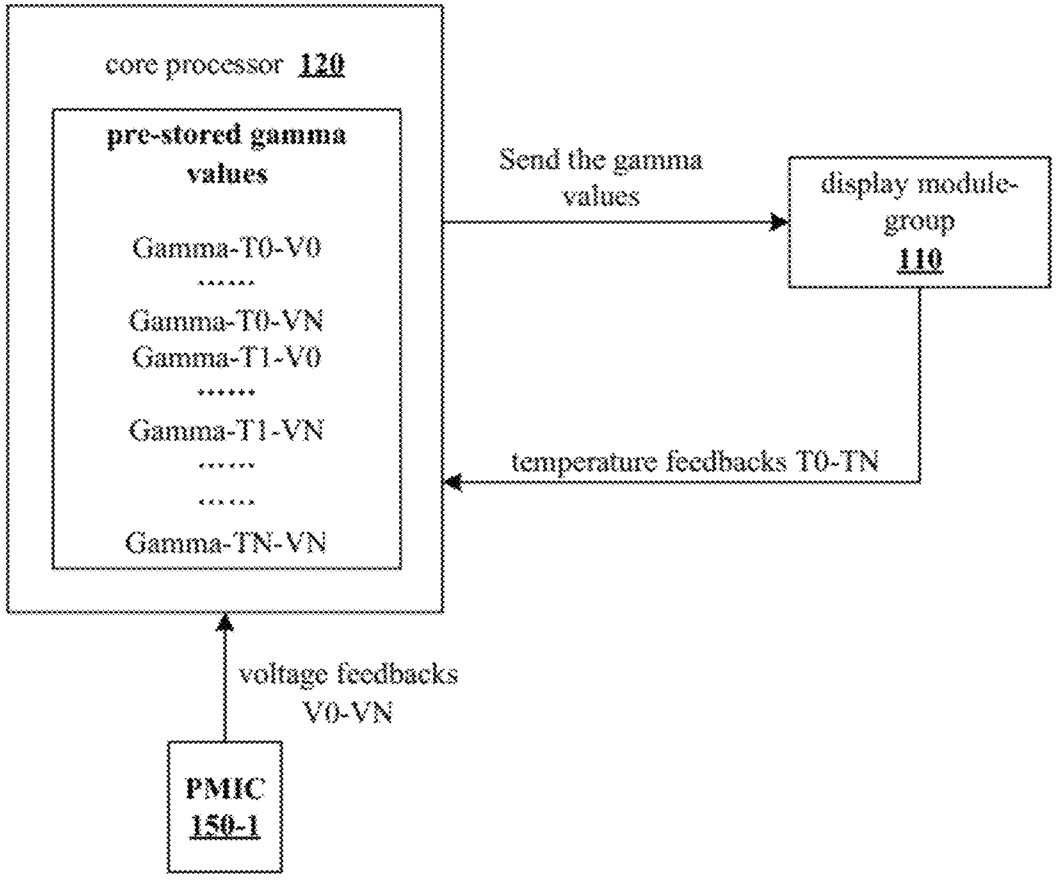
FIG. 9 schematically shows an implementation of active gamma adjustment according to an exemplary embodiment of the present disclosure.

Referring to FIG. 9, it schematically illustrates an implementation of active gamma adjustment according to an exemplary embodiment of the present disclosure. As shown in FIG. 9, the pre-stored gamma values each corresponding to an operating voltage and an module-group internal temperature may be pre-stored in the core processor 120, and when one of voltage feedbacks V0-VN about the output voltage of the PMIC 150-1 is obtained and one of temperature ranges T0-TN about the internal temperature of the display module 110 is obtained, the core processor 120 can select a corresponding gamma value from the pre-stored gamma values and send it to the display module-group 110.

Figure 10:
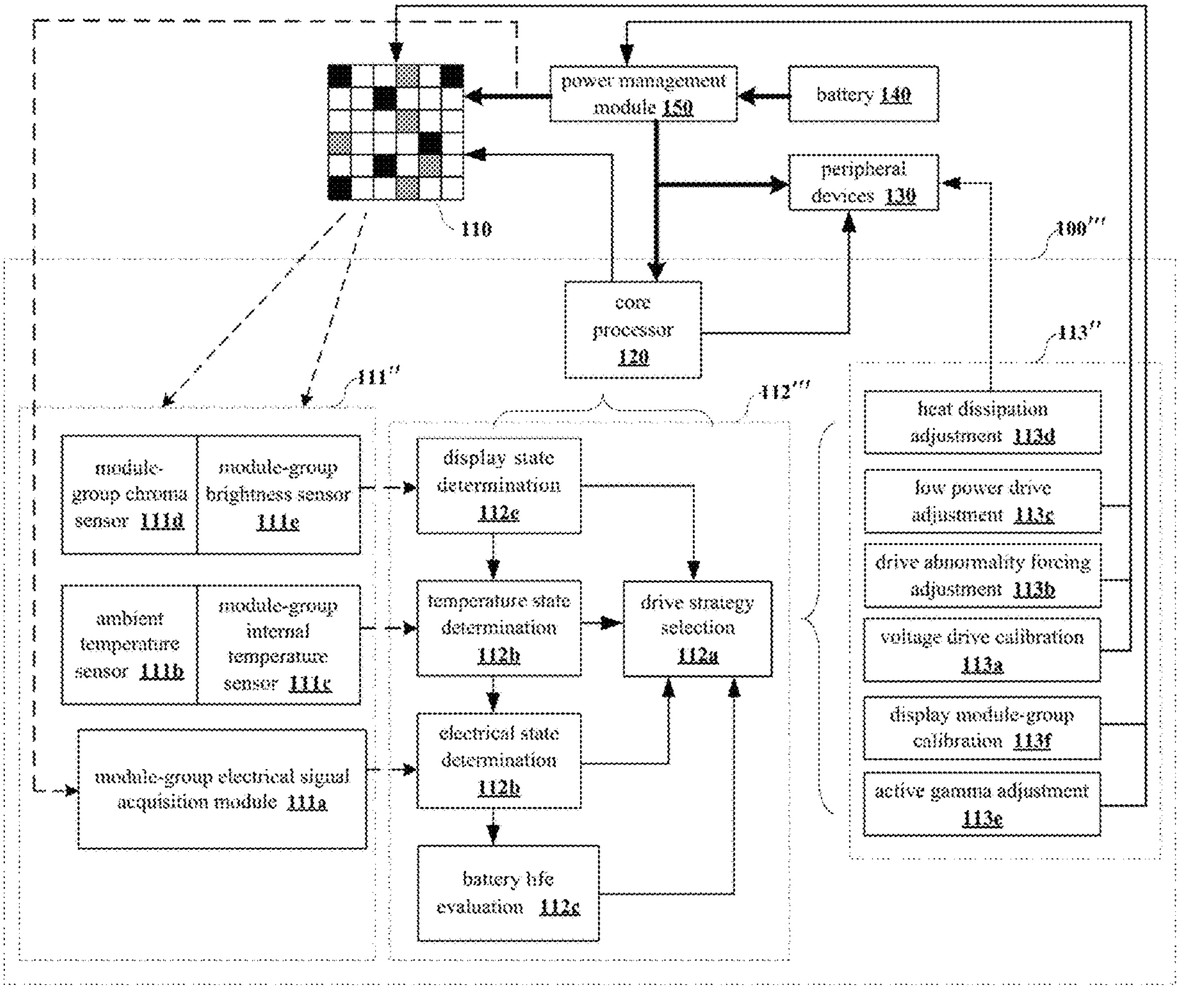
FIG. 10 schematically shows a control system according to yet another exemplary embodiment of the present disclosure in the form of a block diagram.

Referring to FIG. 10, it schematically illustrates a control system according to yet another exemplary embodiment of the present disclosure in the form of a block diagram. As shown in FIG. 10, the control system 100" differs from the control system 100" shown in FIG. 7 only in that the module-group drive state monitoring module 111" further comprises a module-group chroma sensor **111*d* and a module-group brightness sensor 111*e*, the module-group drive control module 112'" further comprises a display state determination module 112*e*, and the module-group drive state adjustment module 113" further comprises a display module-group calibration strategy 113*f***. Accordingly, only the above differences will be described hereinafter, and the other identical features will not be described repeatedly.

Figure 11:
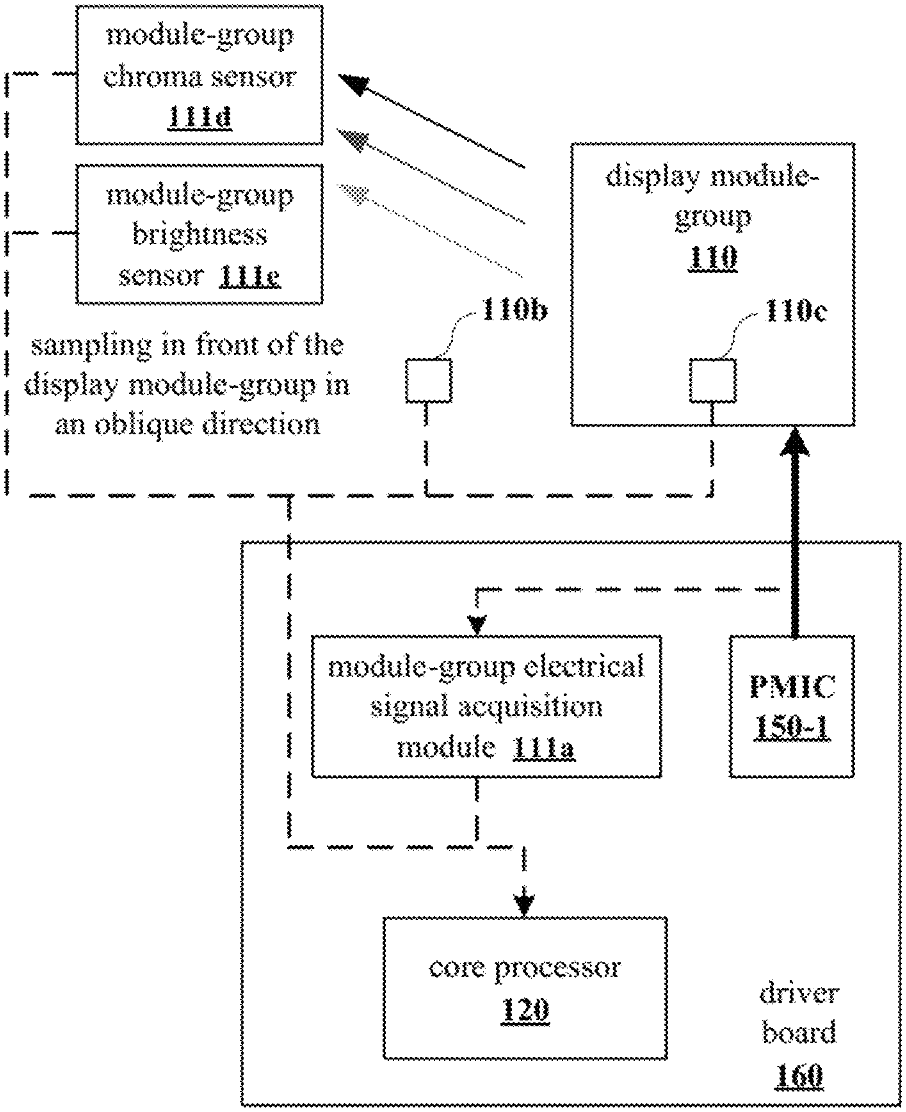
FIG. 11 schematically shows an exemplary arrangement of various sensors in the control system shown in FIG. 10.

The module-group chroma sensor **111*d* is configured to: measure the chromaticity of the display screen of the display module-group 110 to obtain a module-group chromaticity measured value. The module-group brightness sensor 111*e* is configured to: measure the brightness of the display screen of the display module-group 110 to obtain a module-group brightness measured value. Referring to FIG. 11 and in conjunction with reference to FIG. 10, FIG. 11 schematically illustrates an exemplary arrangement of various sensors in the control system shown in FIG. 10. As shown in FIG. 11, the module-group chroma sensor 111*d* and the module-group brightness sensor 111*e* may be arranged obliquely in front of the display module-group 110 so as to measure the display screen of the display module-group 110, the ambient temperature sensor 111*b* may be arranged near the periphery of the display module-group 110, and the module-group internal temperature sensor 111*c* may be arranged in an embedded manner within the display module-group 110, so as to measure the temperature inside the display module-group 110. Furthermore, the module-group electrical signal acquisition module 111*a* may be arranged on a driver board 160 to measure the output voltage and the output current of the PMIC 150-1**. It should be understood that any alternative arrangement of the various sensors is also possible, and the present disclosure does not impose any limitation thereon.

Continuing to referring to FIG. 10, the display state determination module **112*e* is configured to: in the calibration adjustment stage, in response to a difference between the module-group chromaticity measured value and a target chromaticity value being greater than a chromaticity difference threshold, or a difference between the module-group brightness measured value and a target brightness value being greater than a brightness difference threshold, determine a display module-group to be calibrated state; in the feedback adjustment stage, in response to the difference between the module-group chromaticity measured value and the target chromaticity value being greater than the chromaticity difference threshold, or the difference between the module-group brightness measured value and the target brightness value being greater than the brightness difference threshold, determine a display abnormal state; and in response to the display abnormal state, perform a temperature state determination and an electrical state determination, respectively. Therefore, during the feedback adjustment stage, when the display state determination module 112*e*** determines that an abnormal state is displayed, it is necessary to continue to conduct abnormality troubleshooting from two aspects: temperature state and electrical state.

For example, when determining the display abnormal state, it can continue to determine whether the display abnormal state is caused by temperature. If it is caused by temperature, then immediately apply heat dissipation intervention or even switch to low power mode; if it is not caused by temperature, then the determination of the electrical state is performed to determine whether the display abnormal state is caused by the deviation of the electrical drive or the over-voltage and/or over-current. If there is a deviation of the electrical drive, the voltage state will be modulated, and if there is over-voltage and/or over-current, it will immediately alarm and cut off the power supply to protect the display module-group as well as the related devices (for example, the motherboard). If the display abnormal state is not caused by electrical anomalies, the chromaticity and brightness will be re-calibrated to calibrate the actual display screen by modulating the offset of the output screen. In addition, if temperature and electrical anomalies are involved and adjustments are made accordingly, gamma adaptation needs to be performed again, for example, by employing active gamma adjustment to restore the display.

The drive strategy selection module 112*a* is further configured to: select a display module-group calibration strategy in response to the display module-group to be calibrated state. The module-group drive adjustment module 113 is further configured to: in response to adopting the display module-group calibration strategy, perform the following operations: determining a chromaticity calibration value based on the difference between the module-group chromaticity measured value and the target chromaticity value; determining a brightness calibration value based on the difference between the module-group brightness measured value and the target brightness value; and adjusting a chromaticity offset value and a brightness offset value of the display module-group based on the chromaticity calibration value and the brightness calibration value. For example, when performing the calibration of the display module-group, the control system 100''' may read back the measured values detected by the module-group chromaticity sensor 111*d* and the module-group brightness sensor 111*e* via the $I^2C$ bus, which contain the color coordinates and the brightness, and then extract the timestamps of the color coordinates and the brightness data, retrieve a screen at a corresponding time, and perform screen sampling and parsing to obtain the target chromaticity value and the target brightness value corresponding to the actual output screen at that moment, and compare the collected data with the target chromaticity value and the target brightness value to obtain the difference values, so as to derive the calibration values based on the difference values. The control system 100''' may add the calibration values to the screen output, thereby improving the match between the output video stream and the actual state of the display module-group. Thus, it should be understood that in some exemplary embodiments of the present disclosure, the module-group drive state adjustment module 113'' may also drive the display module-group based on manually inputted display control parameters (for example, the required display control parameters, such as a chromaticity value, a brightness value, etc., inputted via a suitable UI or interface) and/or control commands, thereby realizing a more flexible display module drive control of the display module.

Therefore, the control system shown in FIG. 10 realizes effective detection of the brightness, chromaticity, temperature, operating voltage, operating current, power consumption and other states of the display module-group by disposing a variety of sensors and acquisition modules. The control system is able to effectively and accurately determine the current operating state of the display module-group by efficiently collecting the data of the various states and analyzing the data of the various states. The control system can determine a corresponding drive strategy based on the determination result, send instructions to the module-group drive adjustment module based on the drive strategy, and apply various adjustment measures to intelligently drive and adjust the state of the display module, thereby improving the overall performance of the device including the display module-group.

Figure 12:
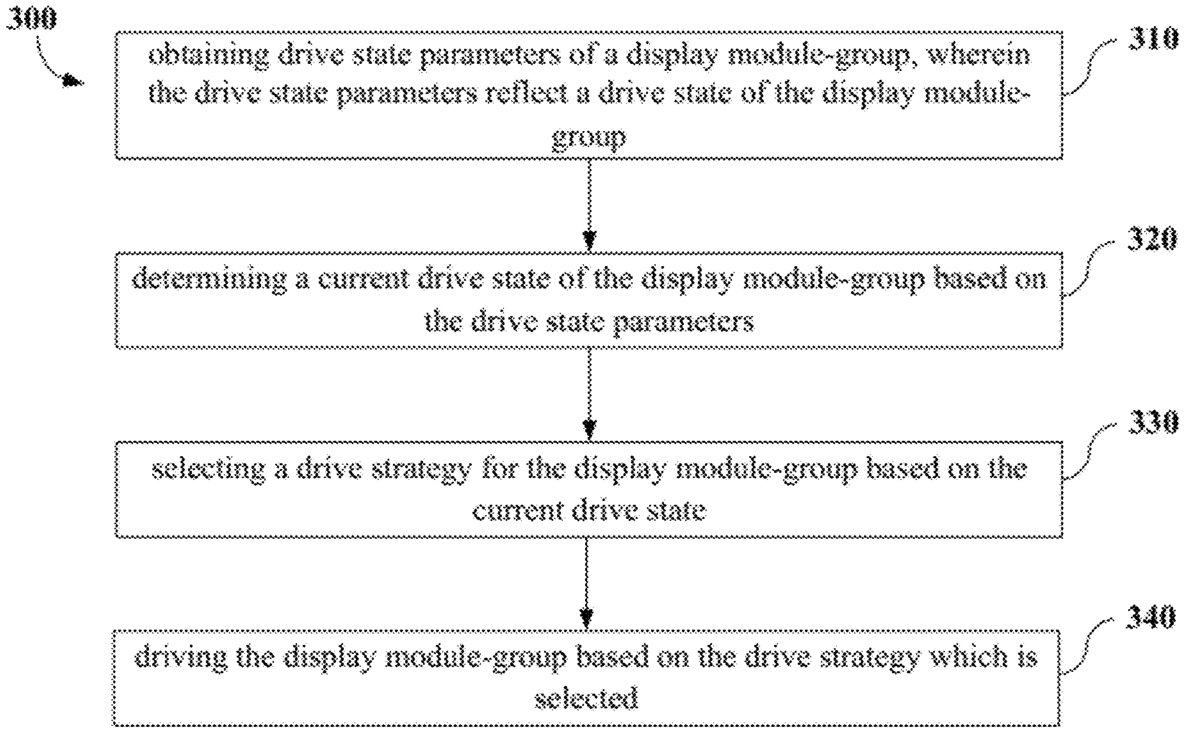
FIG. 12 schematically shows a control method according to an exemplary embodiment of the present disclosure in the form of a flowchart.

Referring to FIG. 12, it schematically illustrates a control method according to an exemplary embodiment of the present disclosure in the form of a flowchart. As shown in FIG. 12, the control method 300 may be applied to the control system 100 shown in FIG. 1.

The control method 300 includes steps 310, 320, 330 and 340:

at step 310, obtaining drive state parameters of a display module-group, wherein the drive state parameters reflect a drive state of the display module-group;

at step 320, determining a current drive state of the display module-group based on the drive state parameters;

at step 330, selecting a drive strategy for the display module-group based on the current drive state;

at step 340, driving the display module-group based on the drive strategy which is selected.

Accordingly, the control method 300 shown in FIG. 12 is capable of monitoring the electrical state of the display module-group 110, such as monitoring at least one of its voltage, current, and power consumption, analyzing and determining a drive state of the display module-group 110 based on the monitoring results, selecting a corresponding drive strategy based on the determined drive state, and thereby carrying out an intelligent drive regulation, thereby enabling reduction of the drive power consumption, preventing electrical anomalies such as over-current, over-voltage, or over-load in the display module-group 110, and ensuring stable and efficient operation of the device.

The workflow of the control system according to the present disclosure generally includes calibration, sensing module monitoring, display anomaly troubleshooting, and active gamma adjustment. In calibration, after the whole machine of the device is started up, the control system first runs the forward calibration function to ensure that the three aspects of the machine, such as the initial state display, the active heat dissipation strategy, and the electrical drive state, are in an optimal state to complete the calibration work. Then, in the sensing module monitoring, the control system uses various sensing modules to monitor the display state of the display module-group to ensure that the display module anomalies are detected in a timely manner. In addition, the temperature and electrical sensors are also in a real-time sampling state to correspond to the subsequent troubleshooting process. During display anomaly troubleshooting process, when determining the display abnormal state, first determine whether the display abnormal state is caused by temperature. If it is caused by temperature, immediately apply heat dissipation intervention or even switch to low power mode; if it is not caused by temperature, the determination of the electrical state is performed to determine whether the display abnormal state is caused by the deviation of the electrical drive or the over-voltage and/or over-current. If there is a deviation of the electrical drive, the voltage state will be modulated, and if there is over-voltage and/or over-current, it will immediately alarm and cut off the power supply to protect the display module-group. If the display abnormal state is not caused by electrical anomalies, the chromaticity and brightness will be re-calibrated to calibrate the actual display screen by modulating the offset of the output screen. In addition, if temperature and electrical anomalies are involved and adjustments are made accordingly, gamma adaptation needs to be performed again, for example, by employing active gamma adjustment to restore the display.

Figure 13:
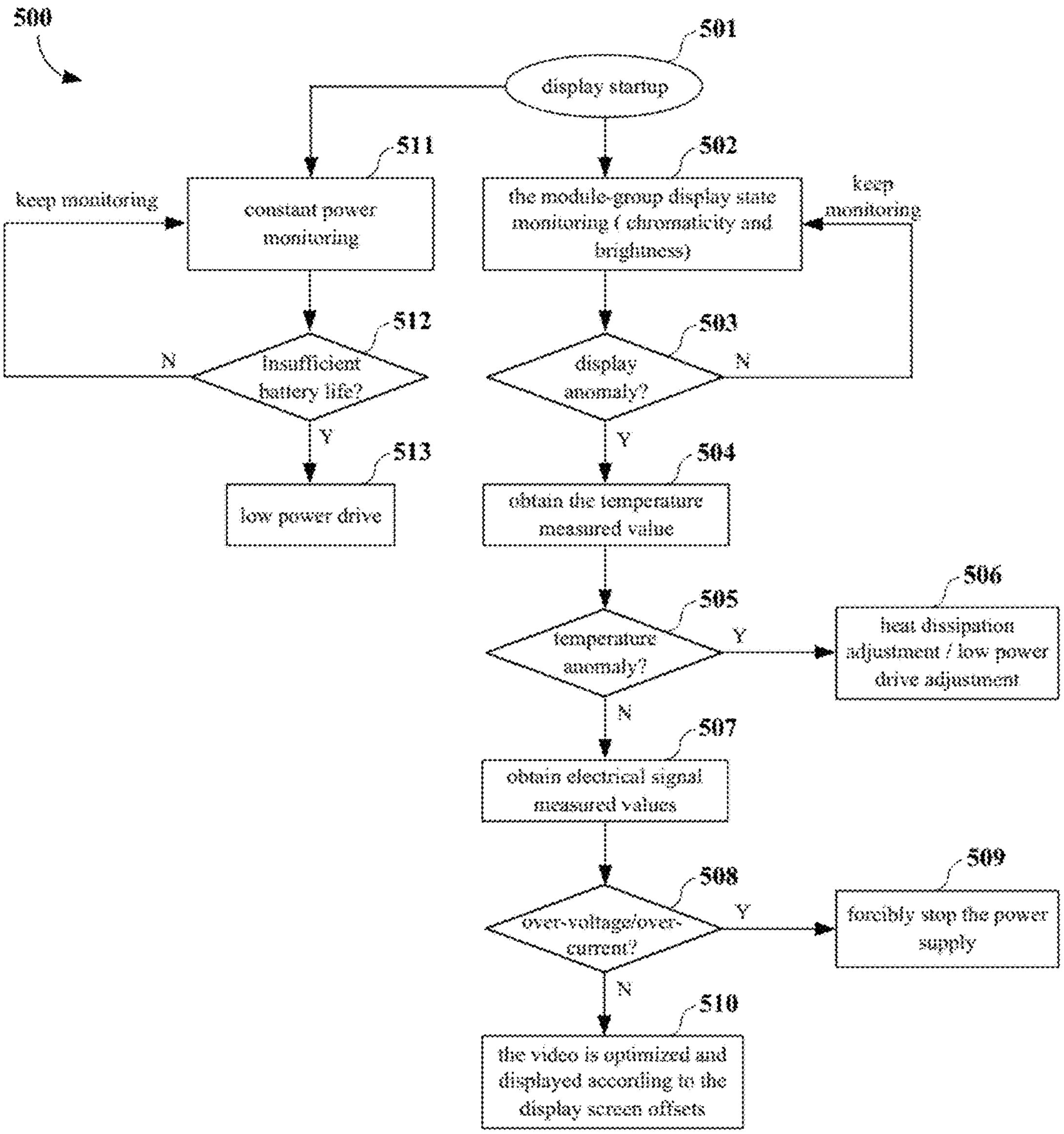
FIG. 13 schematically shows the workflow of a control system according to an exemplary embodiment of the present disclosure in the form of a flowchart.

Referring to FIG. 13, it schematically illustrates, in the form of a flowchart, a workflow of a control system according to an exemplary embodiment of the present disclosure. As shown in FIG. 13, and in conjunction with reference to FIG. 10, at block 501, start a display (for example, a device including the display module-group 110 is started); at block 502, perform the module-group display state monitoring (for example, chromaticity and brightness are monitored via the module-group chroma sensor 111_d_ and the module-group brightness sensor 111_e_); at block 503, determine whether a display anomaly has occurred, and if not, return to block 502 and continue to maintain the module-group display state monitoring, and if a display anomaly occurs, it is also necessary to determine the temperature state and the electrical state, and therefore, the workflow proceeds to block 504 to obtain the temperature measured value (for example, the ambient temperature measured value and the module-group internal temperature measured value); at block 505, determine the temperature state, and if a temperature state anomaly occurs, proceed to block 506 for heat dissipation adjustment or low power drive adjustment, and if the temperature state is normal, proceed to block 507 to obtain electrical signal measured values (for example, voltage, current and power consumption, etc.); at block 508, determine the electrical state, and if an electrical state anomaly occurs, proceed to block 509, forcibly stop the power supply to the display module-group, and if the electrical state is normal, the video can be optimized and displayed according to the display screen offsets at block 510. In addition, while the display is started, constant power monitoring is performed at block 511, a battery life estimation is performed at block 512. If there is no problem with insufficient range, return to block 511 to maintain constant power monitoring, and if there is a problem with insufficient range, a low power drive is taken at block 513.

Thus, based on the workflow shown in FIG. 13, some steps in the control method 300 shown in FIG. 12 may be further limited so that the control method 300 may be applied to the control system 100" shown in FIG. 10. Specifically, step 310 may further include: obtaining display parameters, temperature parameters, and electrical parameters of the display module-group, wherein the display parameters comprise a module-group chromaticity measured value and a module-group brightness measured value, the temperature parameters comprise an ambient temperature measured value and a module-group internal temperature measured value, and the electrical parameters comprises a measured value of an output voltage, a measured value of an output current and a current power consumption value. Step 320 may further include: determining a display state based on the display parameters, determining a temperature state based on the temperature parameters, determining an electrical state based on the electrical parameters, and determining the current drive state of the display module-group based on determination results. Furthermore, based on the workflow shown in FIG. 13, according to some exemplary embodiments, the control method 300 may further comprise the following steps: performing a battery life estimation based on the current power consumption value and a current power value; selecting a drive strategy for the display module-group based on a result of the battery life estimation. Therefore, steps 310 and 320 are defined as described above.

Figure 14:
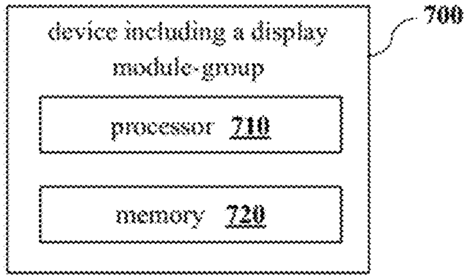
FIG. 14 schematically shows a device including a display module according to an exemplary embodiment of the present disclosure in the form of a block diagram.

Referring to FIG. 14, it schematically illustrates a device including a display module-group according to an exemplary embodiment of the present disclosure in the form of a block diagram. As shown in FIG. 14, a device 700 including a display module-group includes a processor 710 and a memory 720. The memory 720 is configured to store executable instructions, and the executable instructions are configured to cause the processor 710 to perform the above-described control methods described in the present disclosure, when executed on the processor 710. In some exemplary embodiments, the device 700 including the display module-group may be implemented as an AR device, in particular an AR head-mounted device.

Terms used herein are only used to describe the embodiments of the present disclosure, and are not intended to limit the present disclosure. As used herein, the singular forms of “a”, “an”, “the” and “said” are also intended to comprise the plural forms, unless otherwise specified clearly. It shall also be further understood that the terms “comprise” and “include” used in present disclosure indicate the presence of the features, but do not exclude the presence or addition of one or more other features. The term “and/or” used herein comprises any and all combinations of one or more related items as listed. Although the terms “first”, “second”, “third”, etc. are used to describe various features herein, these features should not be limited by these terms. These terms are only used to distinguish one feature from another.

Unless otherwise defined, all terms (including technical terms and scientific terms) used herein have the same meaning as commonly understood by one having ordinary skills in the art, to which the present invention belongs. It should be further understood that terms such as those defined in a common dictionary should be construed as having the same meaning as in the pertinent field or in the context of the specification, and will not be construed in an ideal or overly formal sense, unless defined explicitly as such herein.

In the description of the specification of the present disclosure, expressions such as “an embodiment”, “some embodiments”, “exemplary embodiments”, “specific examples” or “some examples” are intended to mean that specific features, structures, materials or characteristics described with reference to the embodiments or examples are contained in at least one embodiment or example of the present disclosure. In the specification of the present disclosure, schematic descriptions with respect to the above expressions herein do not have to be directed to the same embodiments or examples herein. Instead, specific features, structures, materials or characteristics described thereby may be combined in a suitable manner in any one or more embodiments or examples. Besides, where no contradiction is caused, one skilled in the art may combine and assemble different embodiments or examples described in the specification and features of different embodiments or examples, or omit some technical features from different embodiments or examples described in this specification. Embodiments or examples based on such combination, assembly, or omission are also considered to fall within the scope of the present disclosure.

The methods described in the present disclosure include one or more steps or actions. These method steps and/or actions do not have to be performed in the order described in the present disclosure, but may be performed in a different order, for example, they may be performed at the same time or in a reverse order, as long as they do not contradict the principles of the technical solution described in the present disclosure. In addition, the steps or actions in the method described in the present disclosure may be replaced with different steps or actions, or additional steps or actions may be included, according to practical needs.

The various descriptive logic boxes, modules and circuits described in the present disclosure are hardware circuits capable of being implemented by any suitable techniques known in the art, such as, but not limited to, special purpose integrated circuits with suitable combinational logic gate circuits, programmable gate arrays, field programmable gate arrays, and the like. The present disclosure does not place any limitations thereon.

Although the present disclosure has been described in detail in connection with some exemplary embodiments, it is not limited to the particular form described herein. Rather, the scope of the present disclosure is limited only by the appended claims.

What is claimed is:

1. A control system comprising:

a module-group drive state monitor configured to obtain drive state parameters of a display module-group, wherein the drive state parameters reflect a drive state of the display module-group;

a module-group drive controller configured to: determine a current drive state of the display module-group based on the drive state parameters, and select a drive strategy for the display module-group based on the current drive state;

a module-group drive state regulator configured to: drive the display module-group based on the drive strategy that is selected, wherein:

the drive state parameters comprise: a measured value of an output voltage and a measured value of an output current of a power management integrated circuit supplying power to the display module-group, and a current power consumption value of the display module-group;

the module-group drive state monitor comprises a module-group electrical signal acquisition circuit, the module-group electrical signal acquisition circuit being configured to obtain the measured value of the output voltage, the measured value of the output current, and the current power consumption value;

the module-group drive controller comprises:

an electrical state determination device configured to: determine the current drive state of the display module-group based on the measured value of the output voltage, the measured value of the output current and the current power consumption value;

a drive strategy selector configured to: select a drive strategy for the display module-group based on the current drive state of the display module-group.

2. The control system according to claim 1, wherein the module-group electrical signal acquisition circuit comprises:

a sampling resistor arranged in a power supply path from the output end of the power management integrated circuit to a power supply end of the display module-group;

a voltage sensor configured to: measure a voltage at one end of the sampling resistor to obtain the measured value of the output voltage;

a current sensor configured to: measure a voltage difference across the sampling resistor and obtain the measured value of the output current based on the voltage difference;

a power consumption estimation device configured to: estimate a current power consumption value of the display module-group based on the measured value of the output voltage and the measured value of the output current.

3. The control system according to claim 2, wherein:

the electrical state determination device is further configured to:

in response to the measured value of the output voltage during a calibration adjustment stage being different from an output voltage preset value of the power management integrated circuit, determine a state of voltage to be calibrated;

in response to the measured value of the output voltage during a feedback adjustment stage being greater than a preset voltage specification value, the measured value of the output current being greater than a preset current specification value, or the current power consumption value being greater than a preset power consumption specification value, determine an electrical abnormal state;

the drive strategy selector is further configured to:

in response to the state of voltage to be calibrated, select a voltage drive calibration strategy;

in response to the electrical abnormal state, select a drive abnormality forcing adjustment strategy.

4. The control system according to claim 3, wherein the module-group drive state regulator is further configured to, in response to a selection of the voltage drive calibration strategy, perform the following operations:

based on a difference between the measured value of the output voltage and the output voltage preset value, determine a voltage calibration value;

based on the voltage calibration value, adjust the output voltage of the power management integrated circuit.

5. The control system according to claim 3, wherein the module-group drive state regulator is further configured to, in response to a selection of the drive abnormality forcing adjustment strategy, perform the following operations:

in response to the measured value of the output voltage being less than or equal to a preset over-voltage threshold, the measured value of the output current being less than or equal to a preset over-current threshold, and the current power consumption value being less than or equal to a preset over-load threshold, reducing the output voltage of the power management integrated circuit;

in response to the measured value of the output voltage being greater than the over-voltage threshold, the measured value of the output current being greater than the over-current threshold, or the current power consumption value being greater than the over-load threshold, make the power management integrated circuit stop supplying power to the display module-group.

6. The control system according to claim 3, wherein the module-group drive controller further comprises a battery life evaluator, wherein:

the battery life evaluator is configured to:

estimate a battery life of the display module-group based on the current power consumption value and a current power value received from the module-group drive controller;

in response to the battery life being less than a preset battery life threshold, determine an insufficient battery life state;

the drive strategy selector is further configured to select a low power drive adjustment strategy in response to the insufficient battery life state.

7. The control system according to claim 6, wherein the module-group drive state regulator is further configured to: in response to the low power drive adjustment strategy, make the power management integrated circuit reduce the output voltage.

8. The control system according to claim 2, wherein the module-group electrical signal acquisition circuit further comprises a fuse that is arranged in the power supply path and connected in series with the sampling resistor.

9. The control system according to claim 2, wherein the module-group electrical signal acquisition circuit further comprises:

an electrical signal comparator configured to: in response to the measured value of the output voltage being greater than or equal to a preset over-voltage threshold and/or the measured value of the output current being greater than or equal to a preset over-current threshold, generate an over-voltage/over-current indication signal;

a multi-channel AND gate circuit configured to: perform a logical AND operation between the over-voltage/over-current indication signal and a power management integrated circuit initial enable signal received from the module-group drive controller, so that an obtained power management integrated circuit enable signal is invalid.

10. The control system according to claim 9, further comprising an alarm configured to: perform an alarm operation in response to receiving an alarm enable signal from the module-group drive controller;

wherein the module-group drive controller is further configured to: generate the alarm enable signal in response to receiving the over-voltage/over-current indication signal.

11. The control system according to claim 1, wherein:

the drive state parameters further comprise: an ambient temperature of a surrounding environment of the display module-group and a temperature inside the display module-group;

the module-group drive state monitor further comprises:

an ambient temperature sensor configured to: measure the ambient temperature of the surrounding environment of the display module-group to generate an ambient temperature measured value;

a module-group internal temperature sensor configured to: measure the temperature inside the display module-group to generate a module-group internal temperature measured value;

the module-group drive controller further comprises a temperature state determination device configured to:

determine an ambient temperature abnormal state in response to the ambient temperature measured value being greater than an ambient temperature threshold which is preset;

determine a module-group internal temperature abnormal state in response to the module-group internal temperature measured value being greater than an internal temperature threshold which is preset;

the drive strategy selector is further configured to:

select a heat dissipation adjustment strategy in response to the ambient temperature abnormal state;

select the heat dissipation adjustment strategy or the low power drive adjustment strategy in response to the module-group internal temperature abnormal state.

12. The control system according to claim 11, wherein:

the temperature state determination device is further configured to: in the feedback adjustment stage, when the ambient temperature measured value is not greater than the ambient temperature threshold and the module-group internal temperature measured value is not greater than the internal temperature threshold, in response to a continuous rise in the module-group internal temperature measured value corresponding to a same power consumption value of the display module-group in a preset time period, and the rate of rise being greater than a temperature rise rate threshold which is preset, determine a temperature rise abnormal state;

the drive strategy selector is further configured to: select the heat dissipation adjustment strategy or the low power drive adjustment strategy in response to the temperature rise abnormal state.

13. The control system according to claim 11, wherein:

the electrical state determination device is further configured to: in the feedback adjustment stage, in response to the module-group internal temperature measured value being less than the internal temperature threshold and a positive correlation existing between the module-group internal temperature measured value and the current power consumption value, determine a positive correlation state between temperature and power consumption;

the drive strategy selector is further configured to: select the heat dissipation adjustment strategy or the low power drive adjustment strategy in response to the positive correlation state between temperature and power consumption.

14. The control system according to claim 11, wherein the module-group drive state regulator is further configured to:

in response to selecting the heat dissipation adjustment strategy, perform at least one of the following operations:

increasing an operating voltage provided to a cooling fan;

increasing a duty cycle of a drive signal provided to the cooling fan;

in response to selecting the low power drive adjustment strategy, make the power management integrated circuit to reduce the output voltage.

15. The control system according to claim 14, wherein the module-group drive state regulator is further configured to:

determine a corresponding gamma adjustment value based on the measured value of the output voltage and the module-group internal temperature measured value;

reset a gamma value employed in the display module-group with the gamma adjustment value.

16. The control system according to claim 11, wherein:

the drive state parameters further comprise a chromaticity and a brightness of a display screen of the display module-group;

the module-group drive state monitor further comprises:

a module-group chroma sensor configured to: measure the chromaticity of the display screen of the display module-group to obtain a module-group chromaticity measured value;

a module-group brightness sensor configured to: measure the brightness of the display screen of the display module-group to obtain a module-group brightness measured value;

the module-group drive controller further comprises a display state determination device configured to:

in the calibration adjustment stage, in response to a difference between the module-group chromaticity measured value and a target chromaticity value being greater than a chromaticity difference threshold, or a difference between the module-group brightness measured value and a target brightness value being greater than a brightness difference threshold, determine a display module-group to be calibrated state;

in the feedback adjustment stage, in response to the difference between the module-group chromaticity measured value and the target chromaticity value being greater than the chromaticity difference threshold, or the difference between the module-group brightness measured value and the target brightness value being greater than the brightness difference threshold, determine a display abnormal state; and in response to the display abnormal state, perform a temperature state determination and an electrical state determination, respectively;

the drive strategy selector is further configured to: select a display module-group calibration strategy in response to the display module-group to be calibrated state.

17. The control system according to claim 16, wherein the module-group drive regulator is further configured to: in response to adopting the display module-group calibration strategy, perform the following operations:

determining a chromaticity calibration value based on the difference between the module-group chromaticity measured value and the target chromaticity value;

determining a brightness calibration value based on the difference between the module-group brightness measured value and the target brightness value;

adjusting a chromaticity offset value and a brightness offset value of the display module-group based on the chromaticity calibration value and the brightness calibration value.

18. A control method applied to the control system according to claim 1, comprising the following steps:

obtaining the drive state parameters of the display module-group, wherein the drive state parameters reflect a drive state of the display module-group;

determining the current drive state of the display module-group based on the drive state parameters;

selecting a drive strategy for the display module-group based on the current drive state;

driving the display module-group based on the drive strategy which is selected.

19. A device comprising a display module-group, wherein the device comprises a processor and a memory, the memory is configured to store executable instructions, the executable instructions are configured, when executed on the processor, to make the processor to perform the control method according to claim 18.

* * * * *